Figure 1:
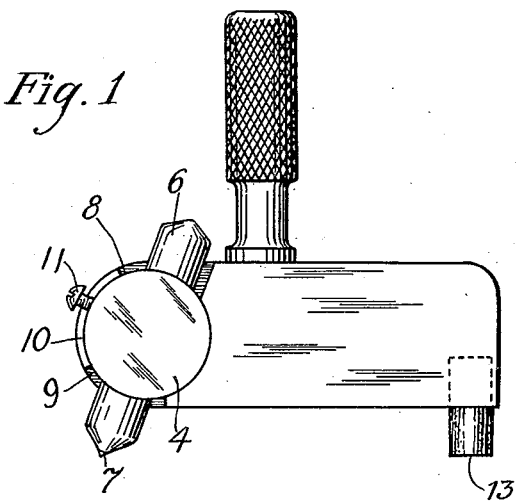

R. FRIEBERTSHAUSER.
GLASS CUTTER.
APPLICATION FILED NOV. 26, 1910.

1,005,637.

Patented Oct. 10, 1911.

Witnesses,
B. W. Pierce
E. C. Mosher

Inventor.
Robert Friebertshauser;
by Beckert & Mulalee
his
Attorneys.

UNITED STATES PATENT OFFICE.

ROBERT FRIEBERTSHAUSER, OF LOS ANGELES, CALIFORNIA.

GLASS-CUTTER.

1,005,637.  Specification of Letters Patent.  Patented Oct. 10, 1911.

Application filed November 26, 1910. Serial No. 594,397.

*To all whom it may concern:*

Be it known that I, ROBERT FRIEBERTSHAUSER, a citizen of the United States, residing at Los Angeles, in the county of Los Angeles and State of California, have invented new and useful Improvements in Glass-Cutters, of which the following is a specification.

This invention relates to glass cutters, and similar devices and implements, such as embody an adjustable tool or cutter, a body by which the same is carried, and other adjuncts incident to the manipulation and guiding of the same across or in connection with the work; and the invention has for its object to provide improvements in glass cutters of the character stated which will be superior in point of relative simplicity and inexpensiveness of construction, convenience in use, facility and accuracy of adjustment in accordance with working conditions, and positiveness in operation; and which will be generally superior in point of efficiency and serviceability.

The invention consists in the novel provision, construction, formation, combination, association and relative arrangement of parts, members and features hereinafter described, shown in the drawing and finally pointed out in claims.

Figure 2:
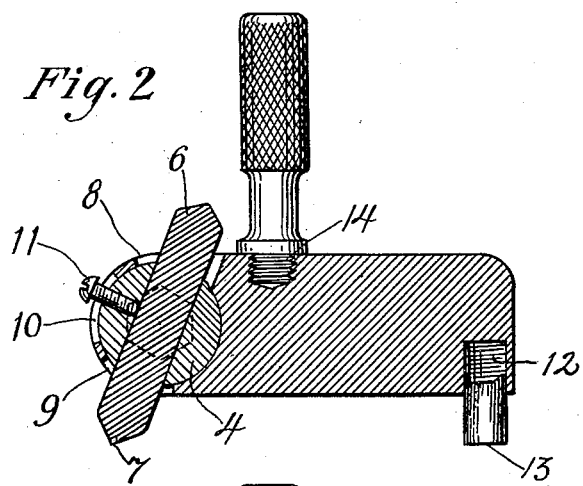
Figure 3:
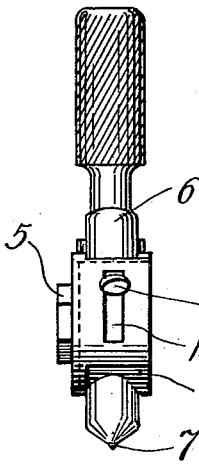

In the drawing:—Figure 1 is a side elevation of a glass cutter constructed and organized in accordance with the invention; Fig. 2 is a longitudinal sectional view of the same, partly in elevation; and, Fig. 3 is a front end elevation of the same.

Corresponding parts in all the figures are denoted by the same reference characters.

Referring with particularity to the drawing, the improved glass cutter shown therein comprises a tool or cutter, a body with which the same is connected through the agency of an adjustable tool holder, means for maintaining the holder in position of adjustment, means for maintaining the tool or cutter in position of adjustment in the holder, a combined guide and wiper element connected with and projecting from the body, and a handle or manipulating element connected with and projecting from the body.

In a preferred form of construction, the body is elongated in form, and provided at the forward end portion with the holder which comprises a cylindrical body 4 fitted into a correspondingly formed chamber produced within the body from one side thereof, so that the body 4 has a close fit therein; said body 4 having a headed bolt lateral fitting constituting the means for maintaining the holder in position of adjustment; 5 designating the head thereof, which bears against the side face of the body opposite to the face through which is produced the cylindrical chamber which receives the body 4. The tool or cutter comprises a body 6, preferably cylindrical, which is received within a radial chamber formed through the body 4, such body 6 projecting at both ends beyond the body 4 and carrying at one end the cutting element 7, customarily a diamond. The end portion of the body at which the holder is located is provided with an upper segmental slot 8 and a lower segmental slot 9 which accommodate respectively the upper and lower ends of the cutter body 6, permitting oscillation of the holder body 4 and of the cutter body 6 with the ends of the latter projecting beyond the periphery of the former. The forward face of the same end of the body is provided with a segmental slot 10 which accommodates the means for holding the cutter in position of adjustment in the holder; said means comprising a set screw 11 projecting through said slot 10 and fitting a tapped bore in the body 4, the inner end of said screw 11 being brought to bear against the body 6 of the cutter.

The guide and wiper, disposed at the rearward end of the body, comprises a length or mass 13 of felt which projects beneath the body, one end or a portion thereof being received by and within an opening produced from the lower portion of the body and having a sharp thread 12 tapped therein and with which the felt mass firmly co-engages in screw connection. The handle or manipulating element projects upwardly from the body intermediate of the ends thereof, having a detachable thread connection therewith, as at 14.

In using the cutter above described, it is guided over or in connection with the work by the handle, so that the cutting element 7 is brought to bear upon the work along the desired line of cut, and the cutting element is kept in proper presentation to the work by the guide which also acts as a wiper to clean the path of the cut to be produced by the cutting element. The degree of projection of the cutting element beneath the body is determined in accordance with the degree of axial adjustment of the holder, and also in connection with the degree of longitudinal adjustment of the tool or cutter through the bore in the holder. The former adjustment is maintained fixed, as predetermined, by the means consisting of the headed bolt fitting 5; and the latter adjustment is maintained fixed as determined, by the means consisting of the set screw 11. The cutter body 6 may also be turned upon its longitudinal axis to present the desired facet or cutting portion, face or edge of the cutting element 7 to the work, and the set screw 11 holds the body 6 in the position resultant upon such adjustment. Adjustment of the holder will manifestly vary the angle of projection of the tool or cutter beneath the body, varying the angle of attack of the cutter with respect to the work. The felt mass of the guide and wiper may also be screwed inwardly or outwardly of the body to change the said angle of projection of the tool or cutter.

I do not desire to be understood as limiting myself to the specific construction, formation, combination and association of parts, members and features shown and described; but reserve the right to vary the same, in adapting the improvements to varying conditions of use, without departing from the spirit of the invention and the terms of the following claims.

Having thus described my invention, I claim and desire to secure by Letters Patent:—

1. A device of the character described, comprising a body provided with a cylindrical chamber, a cylindrical tool or cutter holder mounted for axial adjustment within said chamber and provided with a headed bolt lateral fitting constituting means for maintaining the tool or cutter holder in position of axial adjustment, there being segmental slots in said body and a bore transverse of said tool or cutter holder within which a tool or cutter is received and accommodated, and means projecting through one of said segmental slots for maintaining the tool or cutter in position of adjustment within the bore in said tool or cutter holder.

2. A device of the character described, comprising a body provided with a cylindrical chamber, a cylindrical tool or cutter holder mounted for axial adjustment within said chamber and provided with a headed bolt lateral fitting constituting means for maintaining the tool or cutter holder in position for axial adjustment, there being segmental slots in said body and a bore transverse of said tool or cutter holder within which a tool or cutter is received and accommodated, and means for maintaining the tool or cutter in position of adjustment within the bore in said tool or cutter holder; said latter means comprising a set screw mounted in the tool or cutter holder and accommodated by a segmental slot in said body.

In testimony whereof, I have signed my name to this specification in the presence of two subscribing witnesses.

ROBERT FRIEBERTSHAUSER.

Witnesses:
RAYMOND I. BLAKESLEE,
C. P. WARDEN.

---

Copies of this patent may be obtained for five cents each, by addressing the "Commissioner of Patents, Washington, D. C."